# United States Patent [19]

Martin et al.

[11] Patent Number: 6,114,011
[45] Date of Patent: *Sep. 5, 2000

[54] RETROREFLECTIVE STRUCTURE

[75] Inventors: David C. Martin, Berlin; Edward D. Phillips, Oakville; William P. Rowland, Southington, all of Conn.

[73] Assignee: Reflexite Corporation, Avon, Conn.

[ * ] Notice: This patent is subject to a terminal disclaimer.

[21] Appl. No.: 09/185,153

[22] Filed: Nov. 3, 1998

Related U.S. Application Data

[63] Continuation of application No. 08/596,805, Feb. 5, 1996, Pat. No. 5,831,766, which is a continuation-in-part of application No. 08/578,973, Dec. 27, 1995, abandoned, which is a continuation-in-part of application No. 08/088,252, Jul. 7, 1993, Pat. No. 5,637,173, which is a continuation of application No. 08/018,766, Feb. 17, 1993, abandoned.

[51] Int. Cl.$^7$ .............................. G02B 5/122; B32B 3/00
[52] U.S. Cl. ........................ 428/172; 359/530; 156/230; 156/247
[58] Field of Search ............................. 428/172, 48, 143, 428/913, 209; 359/530, 529, 230, 247; 156/60, 71, 230, 235, 241

[56] References Cited

U.S. PATENT DOCUMENTS

| | | | |
|---|---|---|---|
| 2,380,447 | 7/1945 | Jungersen | 88/78 |
| 3,684,348 | 8/1972 | Rowland | 350/103 |
| 3,689,346 | 9/1972 | Rowland | 156/245 |
| 3,810,804 | 5/1974 | Rowland | 156/245 |
| 3,811,983 | 5/1974 | Rowland | 156/245 |
| 3,830,682 | 8/1974 | Rowland | 161/2 |
| 3,935,359 | 1/1976 | Rowland | 428/172 |
| 3,971,692 | 7/1976 | Anderson | 156/241 |
| 3,975,083 | 8/1976 | Rowland | 350/103 |

(List continued on next page.)

FOREIGN PATENT DOCUMENTS

| | | |
|---|---|---|
| 1303103 | 1/1973 | United Kingdom . |
| 2254826A | 10/1992 | United Kingdom . |
| 2255313A | 11/1992 | United Kingdom . |
| WO93/10985 | 6/1993 | WIPO . |
| WO94/19711 | 9/1994 | WIPO . |

OTHER PUBLICATIONS

Letter from Hugh Rowland, Chairman Reflexite Corporation to Mr. Robert L. Davidson, Chief Chemist, Harrisburg, Pennsylvania Department of Transportation, dated Oct. 7, 1988, regarding "Diamond Dust."

Letter from Hugh Rowland, Chairman, Reflexite Corporation to Mr. Kare Rumar, Swedish Road and Traffic Research Institute, dated Oct. 7, 1988, regarding "Diamond Dust".

Letter from Hugh Rowland, Chairman, Reflexite Corporation to Mr. Kare Rumar, Swedish Road and Traffic Research Institute, dated Nov. 4, 1988, making reference to a sample powder.

Letter from Hugh Rowland, Chairmen Reflexite Corporation to Mr. Taira Nakane, Nakene Company Ltd., dated Nov. 8, 1988, regarding "Diamond Dust" Free Prisms.

Facsimile from M. Kubo, Nakane Co., Ltd. to Timothy Podrotty, Reflexite Corporation, dated Nov. 10, 1988, making reference to "Diamond Dust".

Nakane Co., Ltd., Tokyo Japan, Purchase Order No. 8–41/REF dated Nov. 10, 1988, ordering merchandise from Reflexite Corporation, together with Reflexite Corporation Shipping Order No. R28351 and Invoice No. 28767 dated Nov. 21, 1988 regarding same.

*Primary Examiner*—Donald Loney
*Attorney, Agent, or Firm*—Hamilton, Brook, Smith & Reynolds, P.C.

[57] ABSTRACT

A retroreflective structure is described in which an array of transparent prisms is formed on a release coating of a sheet. The fact side of the prisms is made reflective and the prisms are either released to form a plurality of individual retroreflective structures or the array is adhered to a supporting substrate and then released from the base sheet. In the latter case, the array can be applied to a pre-existing structure formed of compatible fabrics, such as tarpaulins.

15 Claims, 3 Drawing Sheets

U.S. PATENT DOCUMENTS

| | | | |
|---|---|---|---|
| 4,075,049 | 2/1978 | Wood | 156/220 |
| 4,202,600 | 5/1980 | Burke et al. | 350/103 |
| 4,243,618 | 1/1981 | Van Arnam | 264/1 |
| 4,244,683 | 1/1981 | Rowland | 425/143 |
| 4,349,598 | 9/1982 | White | 428/161 |
| 4,555,161 | 11/1985 | Rowland | 350/103 |
| 4,721,649 | 1/1988 | Belisle et al. | 428/325 |
| 4,801,193 | 1/1989 | Martin | 350/103 |
| 5,050,924 | 9/1991 | Hansen | 296/100 |
| 5,084,782 | 1/1992 | Taylor | 359/515 |
| 5,117,304 | 5/1992 | Huang et al. | 359/529 |
| 5,171,624 | 12/1992 | Walter | 428/156 |
| 5,200,262 | 4/1993 | Li | 428/266 |
| 5,202,168 | 4/1993 | Turner et al. | 428/40 |
| 5,207,852 | 5/1993 | Lightle et al. | 156/230 |
| 5,223,312 | 6/1993 | Langille | 428/31 |
| 5,229,882 | 7/1993 | Rowland | 359/530 |
| 5,254,390 | 10/1993 | Lu | 428/156 |
| 5,256,721 | 10/1993 | Wilson et al. | 524/539 |
| 5,262,225 | 11/1993 | Wilson et al. | 428/203 |
| 5,264,063 | 11/1993 | Martin | 156/247 |
| 5,415,911 | 5/1995 | Zampa et al. | 428/40 |
| 5,491,586 | 2/1996 | Phillips | 359/530 |
| 5,637,173 | 6/1997 | Martin et al. | 156/235 |
| 5,786,066 | 7/1998 | Martin et al. | 428/172 |
| 5,805,339 | 9/1998 | Martin et al. | 359/529 |
| 5,831,766 | 11/1998 | Martin et al. | 359/529 |

FIG. 1A
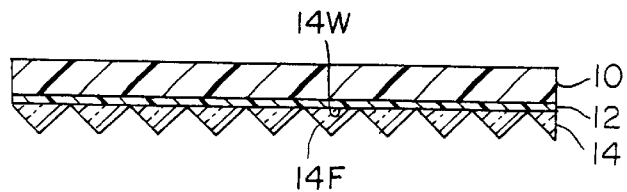
FIG. 1B
FIG. 1C
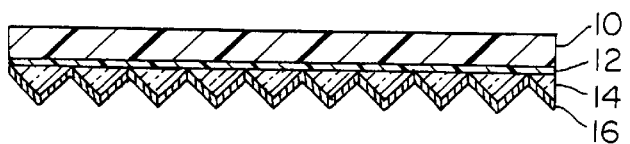
FIG. 1D
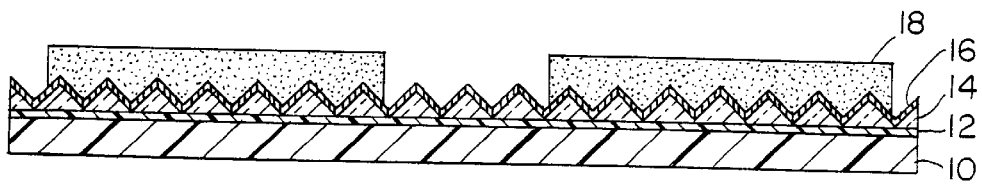
FIG. 1E
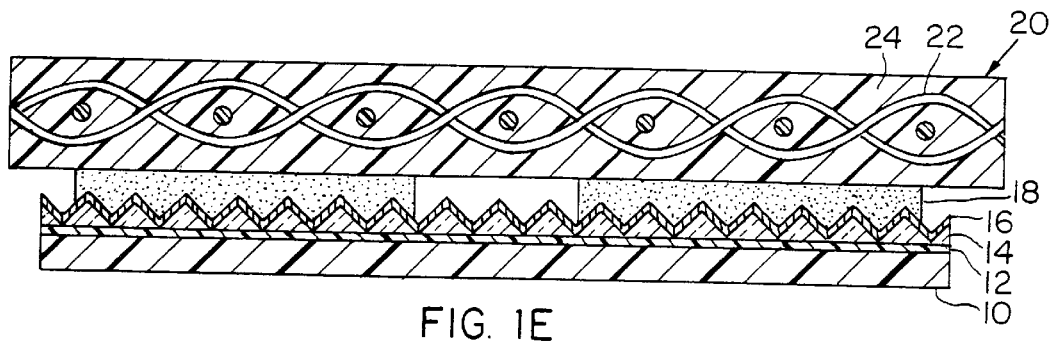
FIG. 1F
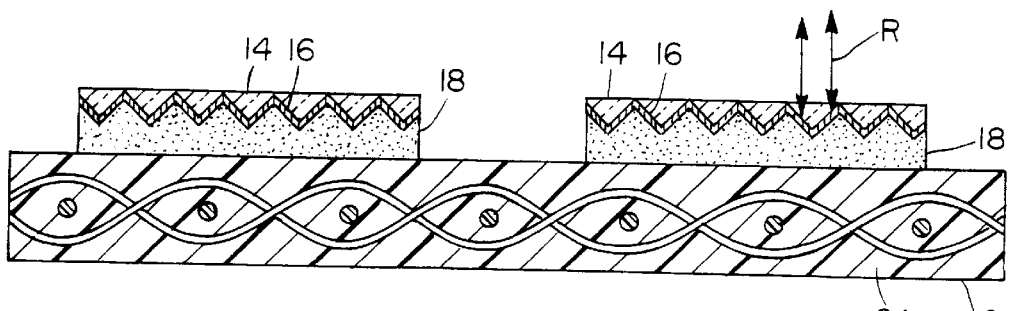

RETROREFLECTIVE STRUCTURE

RELATED APPLICATIONS

This application is a Continuation of U.S. patent application Ser. No. 08/596,805, filed Feb. 5, 1996, now U.S. Pat. No. 5,831,766 which is a Continuation-in-Part of U.S. patent application Ser. No. 08/578,973, filed Dec. 27, 1995, now abandoned which is a continuation-in-part application of pending U.S. patent application Ser. No. 08/088,252, filed Jul. 7, 1993, now U.S. Pat. No. 5,637,173 which is a continuation application claiming priority to U.S. patent application Ser. No. 08/018,766, filed Feb. 17, 1993, now abandoned; all of which are hereby incorporated herein in their entirety by reference.

BACKGROUND OF THE INVENTION

Retroreflective materials are commonly employed for safety and decorative purposes. One type of retroreflective material is formed of molded members having very small prisms or cube corner formations. See, for example, U.S. Pat. No. 3,810,804.

It is often desirable to apply these materials to pre-existing structures; in which case, the retroreflective material may not be compatible with the material of the pre-existing structure or the method of application may be destructive of the retroreflective properties.

A need exists, therefore, for a retrorclective system and process in which the retroreflective material may be fabricated to facilitate permanent transfer to existing structures of different material without damaging the retroreflective material.

SUMMARY OF THE INVENTION

A method and apparatus for forming retroreflective material on a substrate are described in which a release coating is formed on a base material and an array of solid light transparent prisms are formed on the coating by casting the prism array in a plastic oligomer which is adhered to the coating.

The prisms are then made reflective by forming a metal layer on the prisms.

In one embodiment, an adhesive is then applied to the reflective metal layer. A substrate is then applied to the adhesive and the base material is removed at the release coating, leaving an exposed array of free-standing retroreflective prisms, that is prisms with a reflective metal backing affixed to the substrate. In an alternate embodiment, before the adhesive is applied, the prism array may be stripped from the base material at the release coating, thereby freeing the individual prisms in the array. The freed prisms may then be dispersed in a paint or a transparent binder for example, for the purpose of printing retroreflective images on fabrics or painting various substrates.

The substrate is preferably formed of the same material as the structure upon which the retroreflective material is to be secured or is compatible with such structure. For example, the substrate may comprise a sheet of synthetic resin, such as polyvinyl chloride (PVC), polyamide, polypropylene, polycarbonate, or fabrics such as polyester, nylon, or the like, coated with a suitable resin.

Preferably, the substrate with the exposed prism layer may then be covered with a transparent protective layer on the exposed side and the substrate may then be bonded by various well-known techniques to a pre-existing structure of the same or similar material as the substrate.

Alternatively, the adhesive may be a heat activated adhesive applied to the array before metallization. Strips spaced across the length of the array sheeting may then be laminated to a substrate leaving an air space between the array and substrate backing to provide a low cost retroreflective sheet on a suitable substrate fabric.

BRIEF DESCRIPTION OF THE DRAWINGS

FIGS. 1A, 1B, 1C, 1D, 1E and 1F arc process flow schematic cross-sectional views showing the main steps in the fabrication of the retroreflective material of the invention on a substrate.

DETAILED DESCRIPTION OF THE INVENTION

Figure 2:
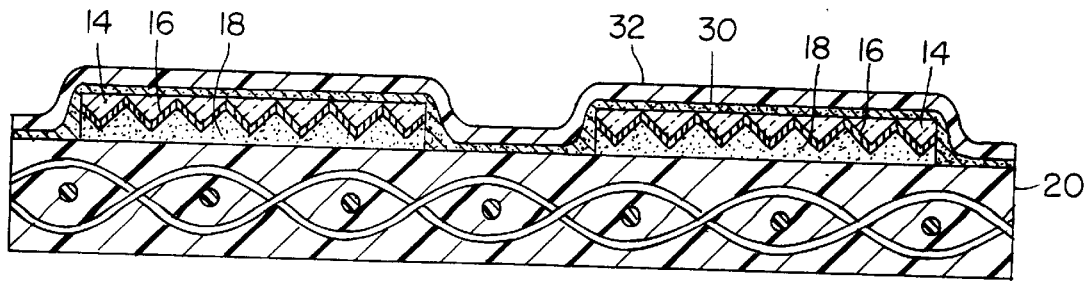
FIG. 2 is a schematic cross-section showing further modification to the FIGS. 1A–1F embodiment.

The invention will now be described in detail in connection with the drawings.

Referring to FIGS. 1A–1F, a preferred embodiment will be described in which the substrate comprises tarpaulin material. This is a particularly appropriate example, since a need exists for a simple and inexpensive method of attaching retroreflective material to truck tarpaulins for safety reasons.

As shown in FIG. 1A, the starting structure consists of base sheet 10 of material, such as a polyester sheet with an acrylic print treatment on one side (sold by DuPont under the name J Film). A release coating, 12 formed of a polyester solvent borne tie cast is applied to the treated side of a 1–4 mils thick sheet 10.

Next, as shown in FIG. 1B, an array of microprisms 14, about 2.8 mils high, is formed on the release coating by casting the prism array onto an epoxy or urethane oligomer and adhering it to the coating. The prisms have a facet side 14F and a window side 14W.

Preferably, the prisms 14 are of the type formed of cube corners in which the three faces intersect at 90° angles and in which the optical and prism axis are coincident, although non-perfect cube corner prisms to achieve special optical effects are within the contemplation of this invention.

The prisms 14 are made reflective by coatings the exposed prisms surface with a metal layer 16, such as aluminum gold or silver of about 500–800 Å thickness (FIG. 1C).

The structure of FIG. 1C is inverted and an adhesive, which can be light transparent, such as a one component moisture curing reactive poly-urethane adhesive 18 (sold by MACE Corp.) is applied to the metallized prism side in a continuous stripe format of about 50 mm stripe length (FIG. 1D).

The substrate 20, shown here for illustration purposes, as a tarpaulin material, is formed of a polyester cloth 22 encapsulated by a plastic material 24. The substrate 20 is laminated to the adhesive 18 (FIG. 1E) at which time the base sheet 10 may be stripped away (FIG. 1D).

This leaves stripes of an array of exposed (free) retroreflective prisms 14 adhered to the substrate 20 by adhesive 18 (FIG. 1F). Light rays R incident upon the face of the prism 14 are retroreflected back by surface 16.

Figure 3:
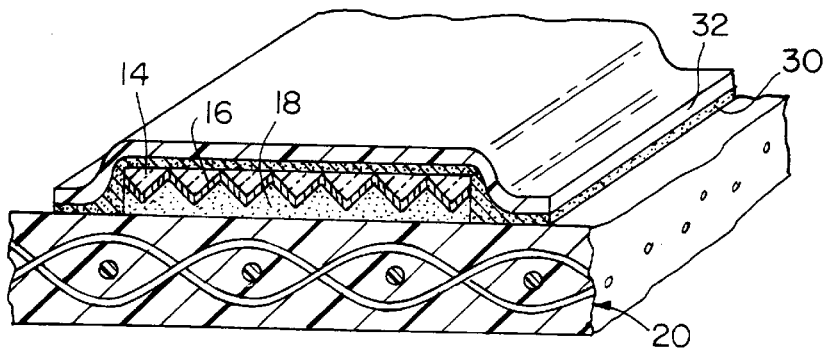
FIG. 3 is a schematic perspective showing a tape formed in accordance with the invention.

The resultant structure shown in FIG. 1F may be further processed, as shown in FIG. 2, by coating the free prism side with a clear adhesive 30 and laminating a clear protective sheet 32 of material, such as polyvinyl, in particular polyvinyl chloride, to the structure. The structure shown in FIG. 2 may then be slit into strips to form tapes, as shown in FIG. 3.

Figure 4:
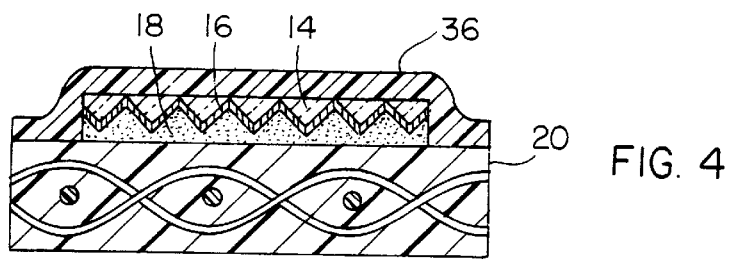
FIG. 4 is a section showing an alternate tape embodiment of the invention.

Alternately, as shown in FIG. 4, the free prism side shown in FIG. 1F may be coated with a material 36 adapted to form a good bond with both the substrate 20 and the free prisms 14.

For example, if the substrate is formed of tarpaulin with an acrylic lacquer coating, then an elastomeric urethane coating would be a good choice for material 36.

Other substrate materials may comprise fabric reinforced and embossed vinyl, coated vinyl, urethanes, polypropylenes and the like.

Figure 5:
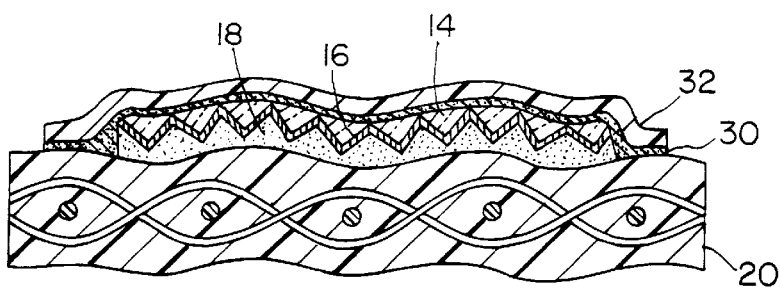
FIG. 5 is a detailed sectional view showing, the prism orientation.

An important feature of the present invention is that the prisms 14, because they are relatively free to move, become somewhat oriented by the shape of the substrate material 20, which improves the retroreflected light distribution, as shown in FIG. 5.

Figure 6:
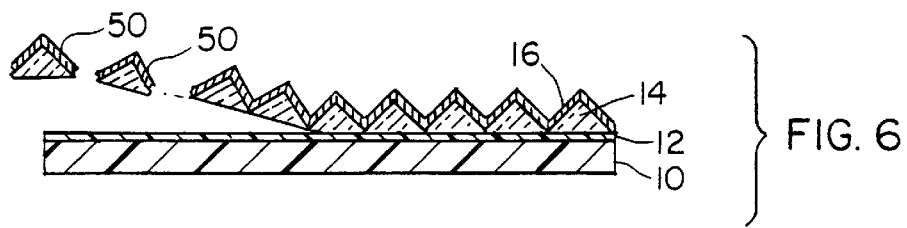
FIG. 6 is a sectional view of an alternate embodiment in which individual retroreflective prisms are formed.
Figure 7:
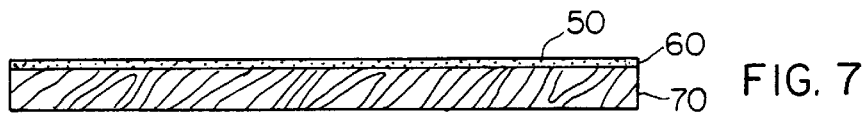
FIG. 7 is a sectional view of a substrate coated with a coating of individual retroreflective prisms dispersed in a liquid such as paint.

FIG. 6 is a sectional view of an alternate embodiment of the invention in which the prism array 14 with reflection layer 16 formed in FIG. 1C is shown partially stripped from the release coating 12 and base sheet 10. As the array 14 is stripped away, thousands of very small individual retroreflective prisms 50 with side dimensions of less than 0.025 inches are freed. These can be collected, mixed with paint or a transparent binder 60 and applied as a decorative retroreflective coating to a suitable substrate 70, such as, fabrics, wood plastic or metal panels, or the like, as shown in FIG. 7.

Figure 8:
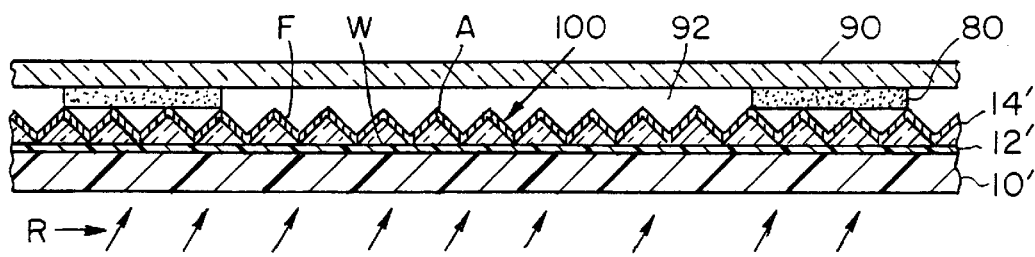
FIG. 8 is a sectional view of a precursor structure of an alternate low cost air backed retroreflective array embodiment.
Figure 9:
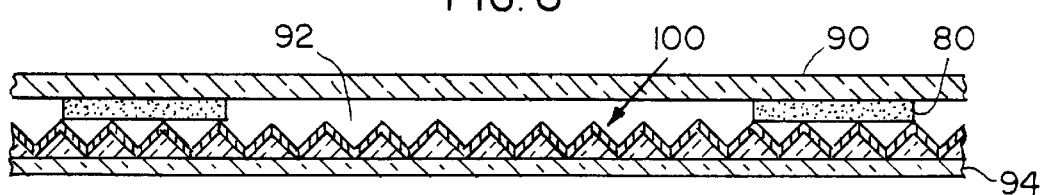
FIG. 9 is a sectional view of the completed embodiment of FIG. 8.
Figure 10:
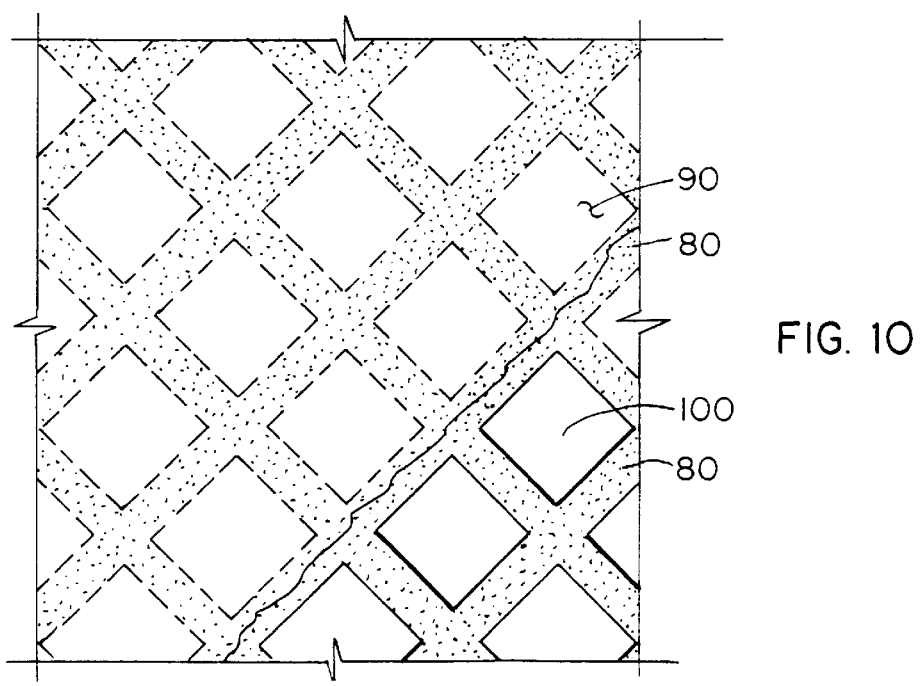
FIG. 10 is a fragmentary plan view of the embodiment of FIG. 9 taken from the substrate 90 side.

Yet another embodiment of the invention will now be described in connection with FIGS. 8–10 wherein an air-backed retroreflective prism array, shown generally at 100, is formed. The array 100 is comprised of solid-transparent microprisms 14' having a base or window side W through which the light rays R initially enter. A facet side F is formed of three intersecting side walls which meet at an apex A. The array 100 is cast in a mold and laminated to a base sheet 10' coated with a release coating 12' such as a polyester solvent. Strips of a heat activated adhesive 80, such as, thermoplastic urethanes or ethylene-vinyl acetates are applied to the facet side F of the array 100, and the structure is then applied to a suitable substrate 90. The adhesive 80 is activated by application of heat to a temperature below the melting point of the prisms i.e. about 180° F. but above the minimum activation temperature of the adhesive, that is 250°–280° F. At this point the releasable coating 12' and base sheet 10' may be stripped from the structure leaving square areas of retroreflective sheeting 100 with pockets of air 92 formed therein to create a suitable index of refraction mismatch to enable retroreflection to occur at the interface. The pockets are sealed at the periphery by the adhesive strips 80 and at the back by the substrate 90. All optional layer 94 may be applied to exposed light incident base side B of the structure, as shown in FIG. 9. Layer 94 may be a protective layer formed for example of polyurethane or the like; or a colored filter layer, or a light scattering layer for altering the distribution of returned light.

Having thus described a few particular embodiment of the invention, various alterations, modifications and improvements will readily occur to those skilled in the art. For example, a pressure sensitive adhesive may be substituted for the heat activated adhesive 80 in FIG. 8. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A retroreflective structure comprising:
   a) a substrate;
   b) a layer of free-standing transparent cube-corner prisms on said substrate; and
   c) a reflective layer formed on the prisms.

2. The structure of claim 1 wherein the substrate is formed of a fabric reinforced with plastic.

3. The structure of claim 1 wherein the substrate is formed of a tarpaulin.

4. The structure of claim 1 wherein the substrate is formed into a tape.

5. The structure of claim 1 wherein the prisms are cast in a transparent plastic material.

6. The structure of claim 1 wherein the prisms are bonded to the substrate with an adhesive.

7. The structure of claim 1 wherein the reflective layer is a metal layer.

8. A retroreflective structure comprising:
   a) a substrate;
   b) an array of free-standing transparent cube-corner prisms having a window side and a facet side on said substrate with the facet side facing the substrate; and
   c) a reflective layer formed on the facet side of the prisms.

9. The structure of claim 8 wherein the substrate is formed of a base sheet of polyester material.

10. The structure of claim 8 wherein the prisms are formed of a light transparent epoxy or urethane material.

11. The structure of claim 1 wherein the prisms are microprisms.

12. The structure of claim 8 wherein the reflective layer is a metal layer.

13. A method of forming a plurality of individual retroreflective microprisms, comprising the steps of:
   a) affixing an array of transparent cube-corner microprisms to a release coating on a sheet of base material wherein each microprism has a facet side and a window side and wherein the window side abuts the release coating;
   b) forming a reflective layer on the facet side of the prisms; and
   c) removing the base material to separate the microprisms into individual retroreflective prisms.

14. The method of claim 13 wherein the microprisms are formed of light transparent epoxy or urethane material.

15. The method of claim 13 wherein the individual retroreflective prisms are collected and mixed with a substance selected from the group consisting of binders, paints, coatings, adhesives, and polymers.

* * * * *